Figure 1:
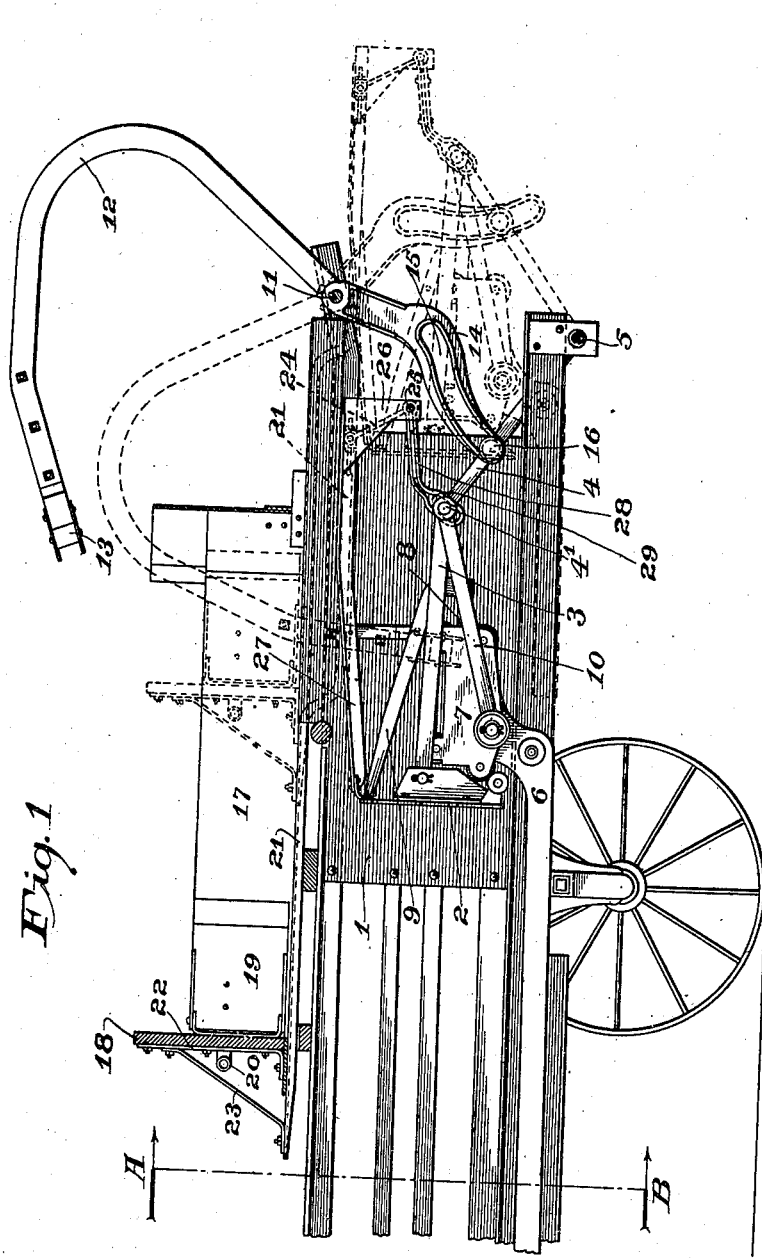

F. A. RYTHER.
HAY PRESS.
APPLICATION FILED APR. 8, 1911.

995,912.

Patented June 20, 1911.

2 SHEETS—SHEET 1.

Witnesses:
C. C. Palmer
F. W. Hoffmeister

Inventor.
Frank A. Ryther.
By E. W. Burgess
Attorney.

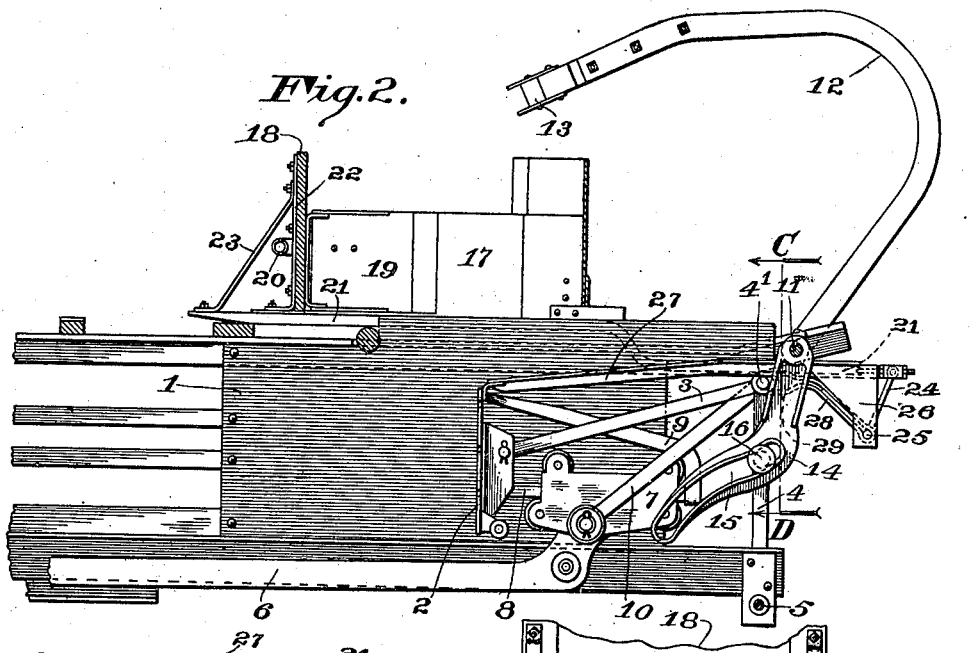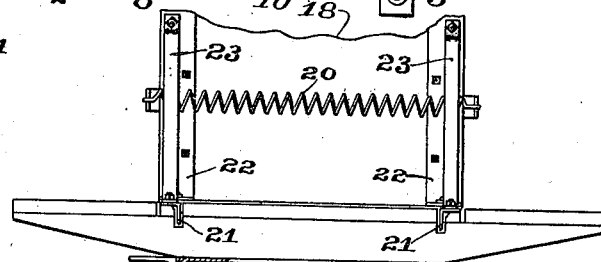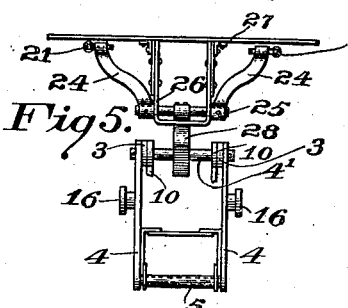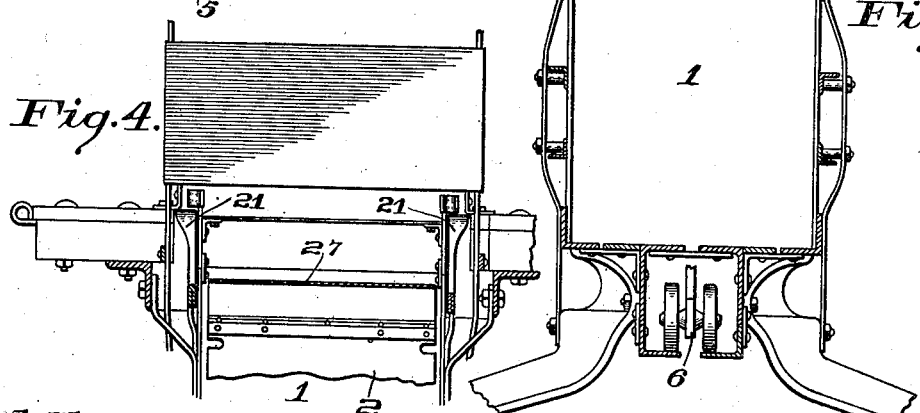

UNITED STATES PATENT OFFICE.

FRANK A. RYTHER, OF CHICAGO, ILLINOIS, ASSIGNOR TO INTERNATIONAL HARVESTER COMPANY, A CORPORATION OF NEW JERSEY.

HAY-PRESS.

995,912.   Specification of Letters Patent.   Patented June 20, 1911.

Application filed April 8, 1911. Serial No. 619,691.

*To all whom it may concern:*

Be it known that I, FRANK A. RYTHER, a citizen of the United States, residing at Chicago, in the county of Cook and State of Illinois, have invented certain new and useful Improvements in Hay-Presses, of which the following is a specification.

My invention relates to hay presses, and in particular to the mechanism for actuating the condenser, and consists in means whereby the condenser mechanism is comparatively stationary during the time the feeder arm is making its feeding stroke; its object being to provide a mechanism that is positively actuated by the presser head during its return stroke in a manner to condense the mass of hay and hold the mass in a condensed form until it is engaged by the feeder, the mechanism being strong, not liable to become disarranged and efficient in operation. I attain these objects by means of the mechanism illustrated by the accompanying drawings, in which—

Figure 1 is a side elevation of a hay press having my invention forming a part thereof; Fig. 2 is a side elevation of a hay press similar to Fig. 1 and illustrating the operation of the condenser actuating mechanism; Fig. 3 is a vertical cross section of the bale chamber and part of the condenser mechanism on line A—B of Fig. 1; Fig. 4 is a cross section of part of Fig. 2 along line C—D; and Fig. 5 is a detached detail of part of the condenser actuating mechanism.

The same reference characters designate like parts throughout the several views.

1 represents a bale chamber, 2 a presser head having plunger bars 3 pivotally connected therewith, the rear ends of the plunger bars being connected with the upper end of a swinging toggle frame, the toggle frame including side bars 4 and a cross shaft $4^1$, having the toggle bars and the plunger bars pivotally connected with opposite ends thereof, the toggle frame having its lower end pivotally connected with the rear end of the bed frame of the bale chamber at 5.

6 represents a pull bar arranged below the bale chamber and having its rear end turned upward and pivotally connected with a block 7 that is slidably mounted upon a stem 8, having its forward end secured to the presser head near its lower edge and its rear end connected with the upper edge of the head by means of a bar 9, and 10 represents pull bars having their forward ends pivotally connected with the sliding block 7 upon opposite sides thereof coaxially with pull bar 6, and their rear ends pivotally connected with the shaft $4^1$ at the upper end of the toggle bars 4 coaxially with the rear ends of plunger bars 3.

11 represents a transverse rock shaft journaled at the rear end of the upper side of the frame of the machine, having a curved feeder arm 12 secured thereto, the arm being provided with a feeder head 13, and 14 represents depending arms secured to opposite ends of the shaft and having cam slots 15 therein that receive rollers 16 that are journaled upon studs carried by the side bars 4 of the swinging toggle frame, whereby the movement of the feeder is controlled by the the presser head operating mechanism.

17 represents fixed walls upon opposite sides of the feed opening and forming part of a condenser chamber, 18 a movable condenser head arranged transversely across the forward end of the chamber and having swinging side walls 19, having their forward ends pivotally connected therewith in a manner whereby their rear ends are permitted to slide along the inner surface of said walls 17, and 20 represents a tension spring connected with the swinging walls forward of their pivotal connection with the head and operative to yieldingly press their rear ends in contact with the fixed walls of the chamber in a well-known way. The movable condenser head at opposite ends thereof is secured to the forward ends of pull bars 21 by means of brackets 22, and 23 represents brace members connecting the upper ends of the brackets with the forward ends of the pull bars. The pull bars are slidably mounted upon the bale chamber and extending rearward are curved downward below the upper wall of the chamber and have their rear ends pivotally connected with the upper ends of arms 24 that have their lower ends secured to opposite ends of a rock shaft 25 that is journaled in a depending bracket 26 secured to the rear end of a shield 27 that is connected at its upper forward end with the upper part of the presser head.

28 represents an arm having its rear upper end secured to the middle portion of rock shaft 25 and provided with a cam slot 29 at its opposite end that receives the shaft 4¹ of the toggle mechanism that is operatively connected with the presser head.

It is desirable in the operation of machines of the class indicated that when the presser head recedes in order that a charge may be admitted to the press chamber that simultaneously with such movement the condenser mechanism be actuated to condense the charge in advance of the feeding movement of the feeder mechanism, and to retain the charge in a condensed state until the feeder head has engaged it for the purpose of forcing it into the bale chamber, and the slotted arms connected with the feeder mechanism and with the condenser mechanism, and actuated by the presser mechanism, are so proportioned as to control the movement of both the feeder arm and the condenser actuating mechanism as desired.

What I claim as my invention, and desire to secure by Letters Patent, is:

1. A hay press including, in combination, a press chamber, a reciprocating presser head movable in said chamber and provided with a shield projecting rearward from its upper edge, means for actuating said presser head, said means including plunger bars having their forward ends pivotally connected with said presser head and their rear ends with the upper end of a swinging toggle frame, said frame having its lower end pivotally connected with a fixed part of the frame of the machine, a depending bracket secured to the rear end of said shield, a rock shaft journaled in said bracket, an arm secured to said rock shaft and provided with a slotted opening that receives a part of the upper end of said swinging toggle frame, upwardly projecting arms secured to opposite ends of said rock shaft, and a condenser including fixed and movable members and having said movable members connected with the upper ends of said upwardly projecting arms.

2. A hay press including, in combination, a press chamber, a reciprocating presser head movable in said chamber and provided with a shield projecting rearward from its upper edge, means for actuating said presser head, said means including plunger bars having their forward ends pivotally connected with said presser head, a swinging toggle frame including side bars and a transverse bar connecting their upper ends with the rear ends of said plunger bars, the lower ends of said side bars being pivotally connected with a fixed part of the frame structure, a depending bracket secured to the rear end of said shield, a rock shaft journaled in said bracket, an arm secured to said bracket, projecting forward therefrom and provided with a slotted opening at its front end that receives the transverse bar of said toggle frame, upwardly projecting arms secured to opposite ends of said rock shaft, and a condenser including fixed and movable members and having said movable members connected with the upper ends of said upwardly projecting arms.

FRANK A. RYTHER.

Witnesses:
  JOHN SWEENEY,
  WILLIAM CLARK.

---

Copies of this patent may be obtained for five cents each, by addressing the "Commissioner of Patents, Washington, D. C."